United States Patent Office 3,067,743
Patented Dec. 11, 1962

3,067,743
ALGINIC COMPOUNDS
Robert Ralph Merton, and Cyril Thomas Blood, London, England, assignors to Alginate Industries Limited, London, England, a company of Great Britain
No Drawing. Filed Oct. 28, 1959, Ser. No. 849,167
Claims priority, application Great Britain Nov. 12, 1958
6 Claims. (Cl. 128—270)

This invention comprises improvements in or relating to alginic compounds.

The invention relates to the use of alginate tampons for contraceptive, antiseptic, germicidal or medicinal purposes. It is known to use a tampon comprising alginate wool or gauze of a degree of solubility in body fluids which is controlled by the proportions of insoluble calcium and soluble alkali metal or ammonium alginate in the product. It is further known to apply a spermicidal substance externally to the fibres of the tampon for contraceptive purposes by immersing the tampon in a solution of the said spermicidal substance before use. Hitherto the spermicidal substance has been incorporated with the alginate fibres by immersing them in an oily liquid containing, for example, ricinoleic acid. This method suffered from several defects. Wetting and dissolving of the alginate was impeded by the presence of an oily film, thus reducing the power of the alginate to absorb the seminal fluid and increasing the tendency for the residual material to persist in the unpleasant form of a partly dissolved mass liable to be discharged from the body at a later time. Also, during storage of the tampons before use the oily spermicidal liquid tends to drain away from the alginate, reducing the activity and impairing storage life.

One object of this invention is to provide a method of ensuring that an adequate and controlled quantity of spermicidal substance is applied by means of the tampon. It has been found possible to prepare a compound alginate of calcium and alkali metal or ammonium, with a spermicidal substance in the form of fibres or wool or gauze fabric. A tampon may be made from such an alginate selected to have a solubility in the body fluids sufficient to release an active level of spermicide with the necessary rapidity, and can be made in a form stable in storage yet ready for immediate use.

We have found that the defects of the known spermicidal tampons previously described may be overcome by adsorption of a small amount of water soluble wetting agent upon a freely soluble alginate fibre comprising entirely, or almost so, ammonium or alkali metal salt of alginic acid. This wetting agent assists absorption of the seminal fluid, and in many cases provides an extremely high level of spermicidal activity. The wetting agent must be of the classes known as anionic and non-ionic; wetting agents of cationic types are not suitable as they are precipitated by alginates.

We have also found that besides preparing such tampons for contraceptive purposes it is possible to prepare similar tampons containing antiseptic, geremicidal or other medicinal ingredients as required for medical treatments of female internal infections. The active ingredient may be, for example, a mild antiseptic, antibiotic or other substance, harmless in use.

Thus, according to the present invention a tampon for one or other of the purposes referred to comprises a fibrous alginate, part at least of which is combined with a second substance, which may be a spermicidal, antiseptic, germicidal or medicinal substance, said tampon being sufficiently soluble in the body fluids to release quickly an effective level of the second substance when used.

The nature of the combination with the second substance may vary provided the second substance has an affinity with the alginic acid or alginate fibre.

As long as the active substance has sufficient affinity for the alginic fibre to enable a convenient dry fibrous article to be prepared containing sufficient active material free from any tendency to separate from the alginic fibres, the combination may be either by chemical means or physical means (for example by adsorption).

From the examples given below it can also be seen that control of the solubility of the alginate in the body fluids by adjustment of the ratio of alkali metal, such as sodium, or ammonium to calcium in the alginate fibre is not always necessary in the case of the present invention, which includes cases in which calcium is absent.

The following are given as examples of fibrous material to be used in the form of tampons, prepared in accordance with the invention:

*Example I*

This is an example of a chemically combined spemicidal product.

2.5 g. calcium alginate yarn were leached with 30 ml. N hydrochloric acid for 15 minutes, and then washed with N water and squeezed as dry as possible. The resulting fibrous alginic acid was suspended in a mixture of 50 ml. alcohol and 10 ml. water. A solution of 1 g. quinine in 10 ml. alcohol was added to the fibre suspensions, and the mixture was boiled under reflux for 15 minutes and allowed to cool. After standing overnight the fibrous alginate was removed and dried. The product was suspended in a mixture of 10 ml. water and 100 ml. alcohol and was then titrated with 0.5 N sodium hydroxide solution using phenolphthalein indicator. The titre of alkali was equivalent to 1.37 g. alginic acid. The final product, comprising essentially sodium quinine alginate in fibrous form, was washed with alcohol and dried. It was readily and rapidly soluble in water, the solution having a pH of 5 and containing quinine.

*Example II*

This is an example of a spermicidal product containing adsorbed wetting agent.

5 g. calcium alginate fibre were leached with normal hydrochloric acid until free from calcium and wholly converted into alginic acid. The resulting fibrous alginic acid was then washed with water until free from hydrochloric acid.

The fibrous alginic acid was suspended in 100 cc. alcohol, and a solution of 1 g. sodium di-octyl sulphosuccinate in 5 cc. alcohol and 5 cc. water was added. The suspension was stirred for one hour, and the fibrous alginic acid was then neutralised by adding 0.5 N sodium carbonate from a burette until the suspension was neutral to phenolphthalein indicator.

The resulting sodium alginate fibre containing adsorbed di-octyl sulphosuccinate was then squeezed free from the alcohol, washed once with 25 cc. alcohol and dried.

The increase in sulphur content of the fibre produced corresponded to a content of sodium di-octyl sulphosuccinate of 0.94%.

*Example III*

This example is of the preparation of a mild antiseptic tampon:

5 g. of soluble ammonium alginate fibre were immersed in 5 cubic centimetres of alcohol solution containing 0.05 gram of acriflavine, and the resulting mass was then drained and allowed to dry. The final product, containing 0.6% of acriflavine combined with ammonium alginate was then made into a tampon suitable for medicinal use.

Example IV

This is an example of the preparation of readily soluble substantially calcium free fibre for contraceptive purposes.

5 kg. calcium alginate fabric were leached with dilute hydrochloric acid (2 litres concentrated acid plus 50 litres water) in a small commercial dyeing machine for 30 minutes at 50° C. The dilute acid was run off, and the treatment of the fabric with dilute hydrochloric was repeated. The waste acid was again run off, and the fabric was washed five times with water until the washings were about pH 5. The fabric was removed and dried.

The dried alginate fabric, now substantially calcium free and in the chemical form of alginic acid, was suspended in a 3% solution of sodium dioctyl sulphosuccinate in alcohol. After thorough mixing with the solution of spermicide the fabric was removed and pressed so that the pick-up of solution of spermicide was 50% by weight (equivalent to a pick-up of spermicide of 1.5%). The fabric was then dried.

The dried fabric was placed in an enclosed chamber, and immersed in ammonia gas at atmospheric pressure for 24 hours, by which time the alginic acid had been converted into ammonium alginate. The fabric was removed from the ammonia chamber and was disintegrated into a physical form like cotton wool by use of well known textile machinery.

The product weighed 4.6 kg., and was in the form of a pale cream coloured wool, which was very readily wetted and dissolved by water. The content of sodium dioctyl sulphosuccinate, after a small physical loss during carding, was 1.3%, and the spermicidal activity was very high.

A suitable weight of this spermicidal alginate wool for contraceptive purposes is approximately 1 g. It is inserted into the vagina by means of a suitable applicator.

Example V

This is a further example of medicated alginate wool for treating internal female infections.

5 kg. calcium alginate fabric were leached with dilute hydrochloric acid (2 litres concentrated acid plus 50 litres water) in a small commercial dyeing machine for 30 minutes at 50° C.). The dilute acid was run off, and the fabric was then washed with water five times. The fabric, now consisting mainly of alginic acid with a small proportion of calcium alginate, was then dried.

The dried alignate fabric was immersed in 25 litres alcohol and its alginic acid content was neutralised by means of a solution of sodium hydroxide in alcohol. After neutralisation 0.5 kg. Domiphen bromide B.P. (dodecyldimethyl-2-phenoxy-ethylammonium bromide), an antiseptic substance, was added. After thorough mixing the fabric was removed and squeezed lightly so that the pick up of alcohol solution of Domiphen bromide was 1 kg. equivalent to 0.4% antiseptic substance on the dry weight of the fabric.

The fabric was then dried, and disintegrated into a form similar to cotton wool. For medicinal use approximately 1 g. of this alginate wool is applied by means of a suitable applicator.

We claim:

1. A process of preparing a fibrous spermicidal tampon soluble in body fluids comprising taking alginic acid fibres, treating them with a solution of quinine in an organic water-miscible solvent and at adequate temperature to bring about a reaction whereby at least 30% by weight of the alginic acid has combined with the quinine as quinine alginate and thereafter neutralizing the remaining alginic acid of the fibres to convert them into soluble alginate fibres.

2. A process of preparing a fibrous spermicidal tampon soluble in body fluids comprising taking alginic acid fibres, treating them with a solution of a spermicide chosen from the anionic and non-ionic wetting agents in a liquid comprising an organic water-miscible solvent until the fibres have adsorbed between 0.25% and 5% of their dry weight of the wetting agent and thereafter neutralizing the alginic acid fibres to convert them into a soluble alginate.

3. A process of preparing a fibrous spermicidal tampon soluble in body fluids comprising taking alginic acid fibres, treating them with a solution of sodium di-octyl sulphosuccinate in a liquid comprising an organic water-miscible solvent until the fibres have adsorbed at least 0.9% sodium di-octyl sulphosuccinate and thereafter neutralizing the alginic acid fibres to convert them into a soluble alginate, removing free liquid and drying.

4. A process of preparing a fibrous spermicidal tampon soluble in body fluids comprising taking alginic acid fibres, treating them with a solution of a spermicide chosen from the sodium anionic and non-ionic wetting agents in a liquid comprising an organic water-miscible solvent until the fibres have adsorbed between 0.25% and 5% of their dry weight of the wetting agent and thereafter converting the alginic acid fibres to soluble sodium alginate.

5. A process of preparing a fibrous spermicidal tampon soluble in body fluids comprising taking alginic acid fibres, treating them with a solution of sodium di-octyl sulphosuccinate in a liquid comprising an organic water-miscible solvent until the fibres have adsorbed at least 0.9% sodium di-octyl sulphosuccinate, and thereafter neutralizing, with a sodium compound, the alginic acid fibres to convert them into a soluble sodium alginate, removing free liquid and drying.

6. A fibrous spermicidal tampon soluble in body fluids comprising essentially dry soluble alginate fibers containing between 0.25% and 5% by weight of adsorbed sodium di-octyl sulphosuccinate.

References Cited in the file of this patent

UNITED STATES PATENTS

| 2,149,240 | Crossley | Feb. 28, 1939 |
| 2,845,070 | Lewing | July 29, 1958 |

FOREIGN PATENTS

| 765,457 | Great Britain | Jan. 9, 1957 |

OTHER REFERENCES

Climenko: "The Spermicidal and Allied Properties of a Mixture of Sodium Sulfo-dioctylsuccinate and Maleic Acid" from Journal of Contraception, Sept. 1938, pages 149–153.

Dickinson: "Control of Conception," 2nd edition 1938 (Baltimore, Maryland, Williams and Wilkins Co.) pages 61–80. (Copies in Division 43.)